Figure 1:
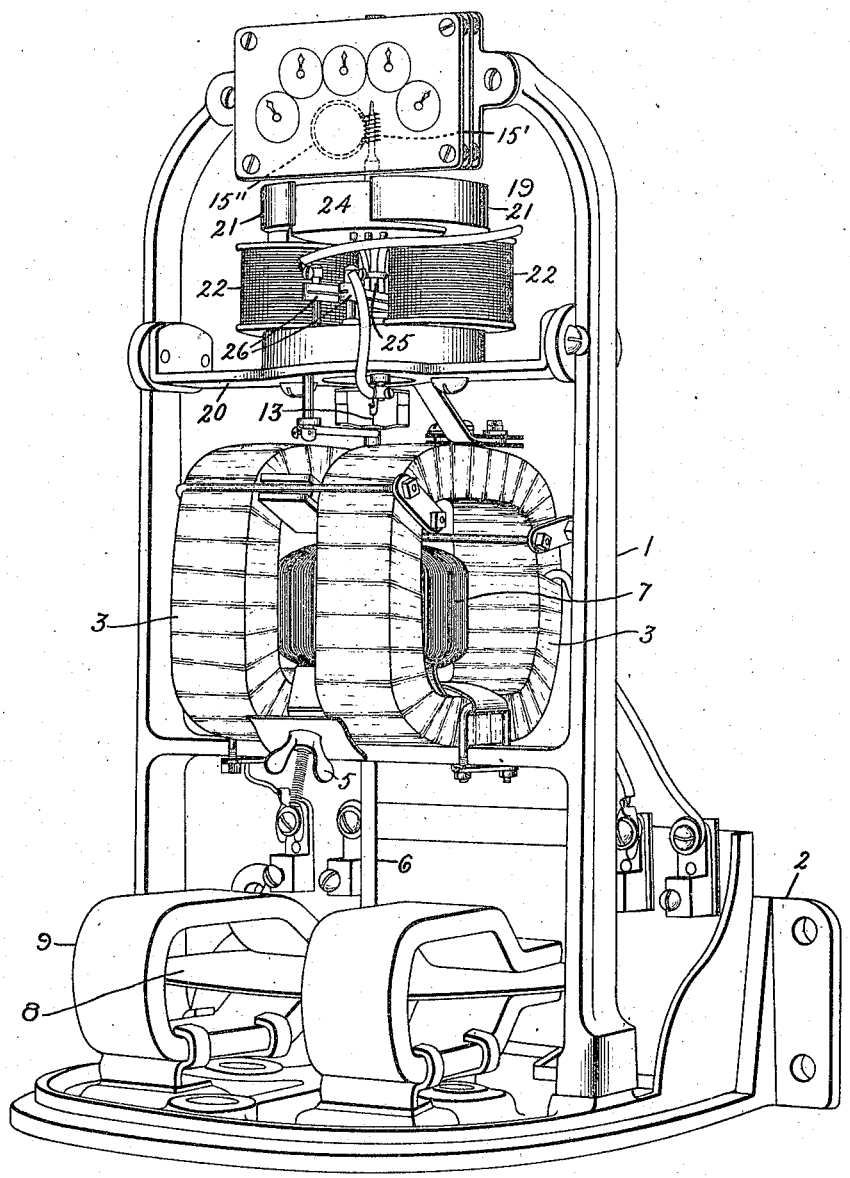

No. 867,561.　　　　　　　　　　　　　　　　PATENTED OCT. 1, 1907.
A. G. DAVIS & C. D. HASKINS.
MEASURING INSTRUMENT.
APPLICATION FILED MAR. 15, 1904.

5 SHEETS—SHEET 1.

Witnesses:
George H. Tilden.
Helen A. Ford.

Inventors:
Albert G. Davis.
Caryl D. Haskins.
by Albert G. Davis
Att'y.

No. 867,561. PATENTED OCT. 1, 1907.
A. G. DAVIS & C. D. HASKINS.
MEASURING INSTRUMENT.
APPLICATION FILED MAR. 15, 1904.

5 SHEETS—SHEET 2.

Witnesses:
George N. Tilden
Helen Orford

Inventors:
Albert G. Davis.
Caryl D. Haskins.
by Albert G. Davis
Att'y.

No. 867,561. PATENTED OCT. 1, 1907.
A. G. DAVIS & C. D. HASKINS.
MEASURING INSTRUMENT.
APPLICATION FILED MAR. 15, 1904.

5 SHEETS—SHEET 4.

Witnesses:
George W. Tilden.
Helen Orford.

Inventors:
Albert G. Davis.
Caryl D. Haskins.
by Albert G. Davis
Att'y.

No. 867,561. PATENTED OCT. 1, 1907.
A. G. DAVIS & C. D. HASKINS.
MEASURING INSTRUMENT.
APPLICATION FILED MAR. 15, 1904.

5 SHEETS—SHEET 5.

Witnesses:
George W. Tilden.
Helen Oxford.

Inventors:
Albert G. Davis.
Caryl D. Haskins.
by Albert G. Davis
Att'y.

UNITED STATES PATENT OFFICE.

ALBERT G. DAVIS AND CARYL D. HASKINS, OF SCHENECTADY, NEW YORK, ASSIGNORS TO GENERAL ELECTRIC COMPANY, A CORPORATION OF NEW YORK.

MEASURING INSTRUMENT.

No. 867,561.   Specification of Letters Patent.   Patented Oct. 1, 1907.

Application filed March 15, 1904. Serial No. 198,219.

*To all whom it may concern:*

Be it known that we, ALBERT G. DAVIS and CARYL D. HASKINS, citizens of the United States, residing at Schenectady, county of Schenectady, State of New York, have invented certain new and useful Improvements in Measuring Instruments, of which the following is a specification.

The object of our present invention is to improve measuring instruments.

Though many of the features of our invention are not limited to any particular class of measuring instruments our invention relates more particularly to the so-called electric motor meters, in all of which there is a certain amount of retardation to the motion of the movable part or parts of the meters, due to friction between movable and stationary parts.

In accomplishing the object of our invention we employ means energized from a source which is independent of the torque of the measuring element of the instrument to carry practically all of the frictional or idle load heretofore necessarily imposed upon the measuring element in instruments of this character.

In practice we have found a satisfactory method of carrying out our invention to consist in employing a working member, in the form of an electric motor, having a vertical shaft from which the movable element of our measuring instrument is suspended by a fiber or wire which allows a limited movement of the movable part of the measuring element under the influence of the force to be measured, without a corresponding movement of the working element. After a certain amount of such independent relative movement has taken place the measuring element, by closing a controlling circuit or in any other suitable way, gives an impulse to the working motor which causes it to move in the same direction as the measuring element. The movement of the working element under these circumstances is sufficient to insure that a certain limited amount of lag of the working element behind the measuring element shall never be exceeded.

In some forms of our invention the movable part of the measuring element moves relatively to the fixed part with a speed depending on the value of the quantity to be measured which may or may not vary. Relatively to the movable part of the measuring element the movable part of the working element first lags, until by reason of such lag the working element is energized, whereupon the moving part of the working element moves in advance of the measuring element. When the working element moves in advance of the measuring element it becomes deënergized and slows down, the movable part of the measuring element then gains upon it and the working element is again energized. The intermittent energization and deënergization of the working element is continued as long as the measuring element continues to move. It will be readily understood that the total movement of the working element will be equal to the total movement of the measuring element though the speed of the two elements at any given instant will usually be different.

As the weight of the moving element of the measuring element is sustained by the working element, through a wire or fiber connection, which exerts practically no frictional retardation to the movement of the measuring member relative to the working member, it will be seen that the frictional retardation due to the weight of the movable element normally to be accounted for in instruments of this character is transferred to the working element. Moreover as the working element moves proportionately to the measuring element we may employ it to drive a counting train or similar indicating mechanism.

In cases in which the measuring element is a commutating motor, the commutator brushes may if desired be transferred to the working member, thus still further reducing the frictional forces tending to resist the movement of the measuring element.

For a better understanding of our invention reference may be had to the accompanying drawings in which we have illustrated several of the many forms in which our invention can be embodied.

Figure 2:
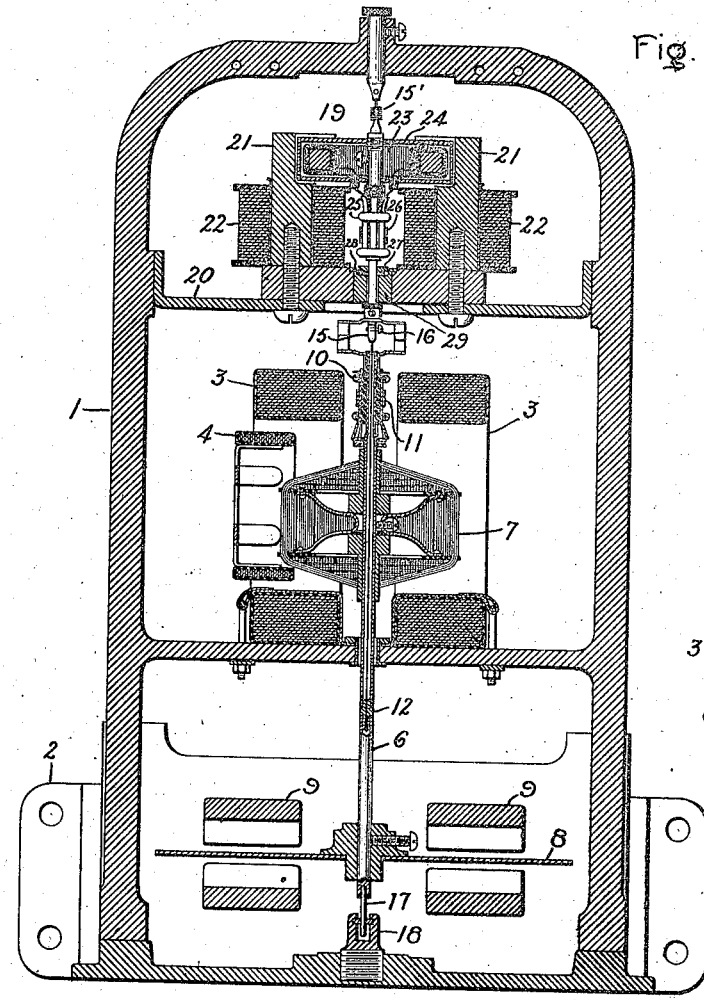
Figure 3:
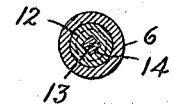
Figure 4:
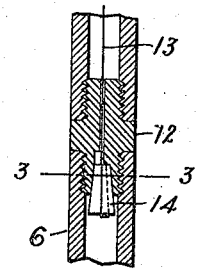
Figure 5:
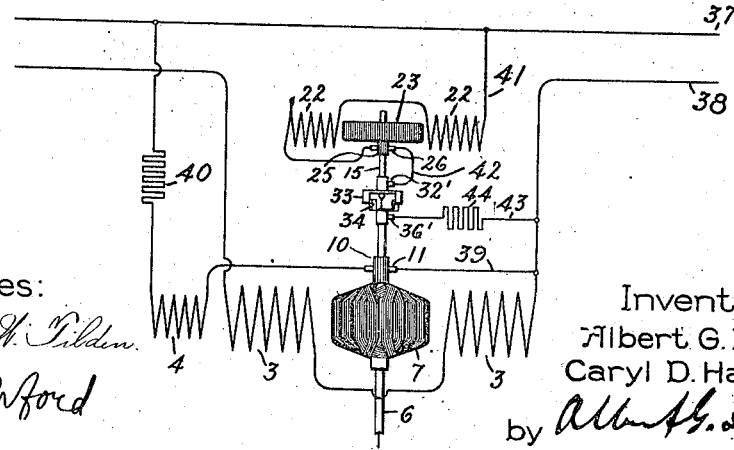
Figure 6:
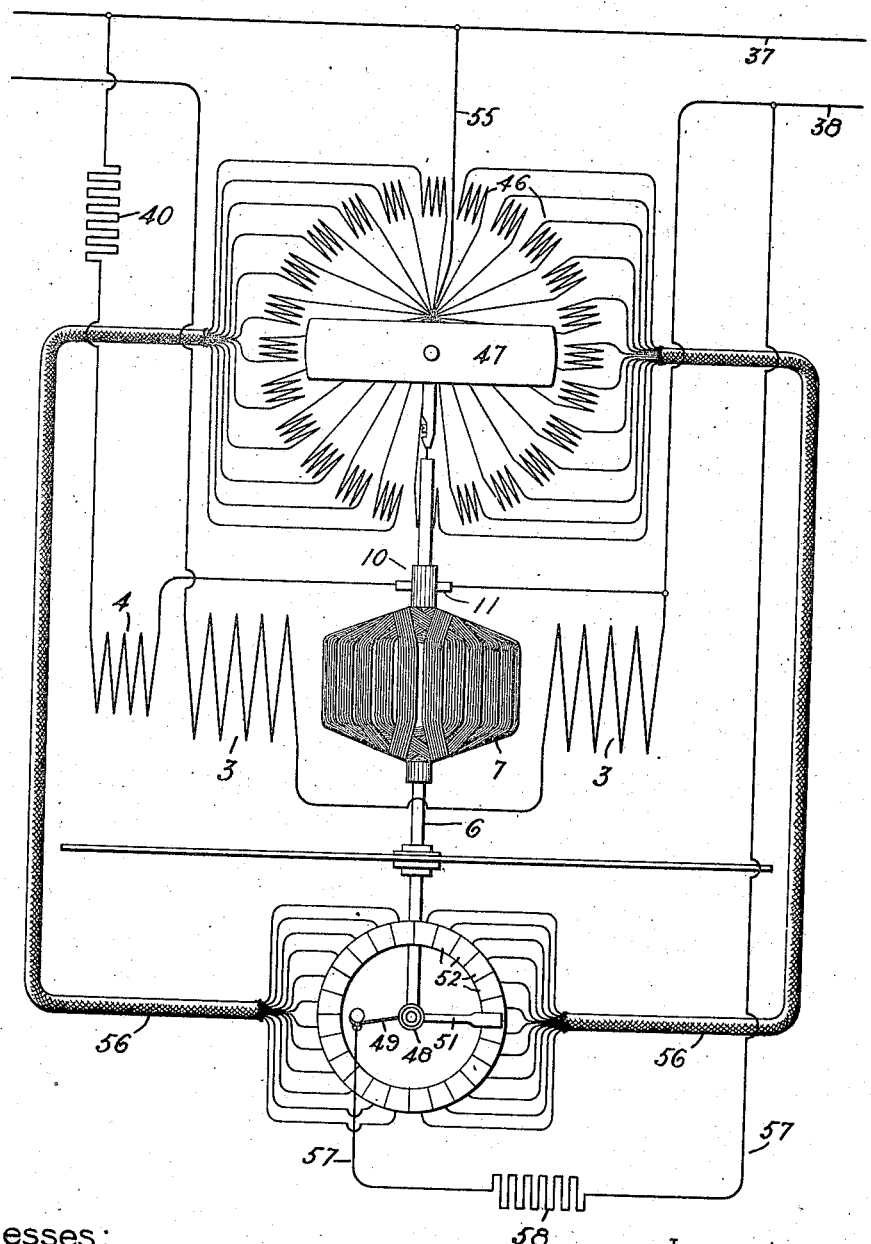
Figure 7:
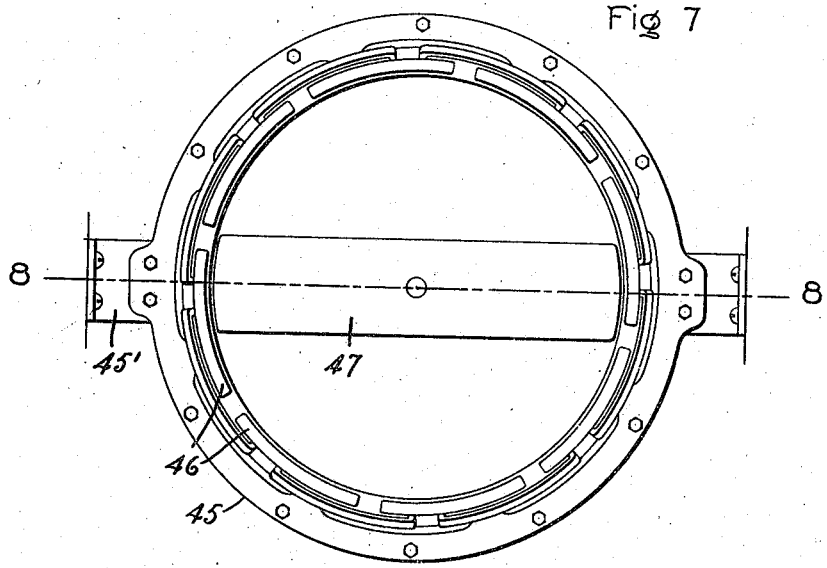
Figure 8:
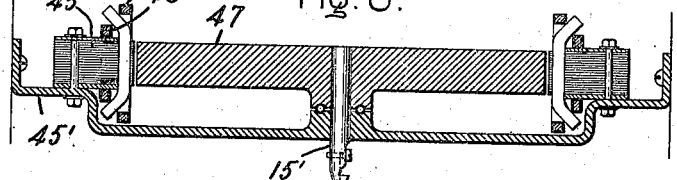
Figure 11:
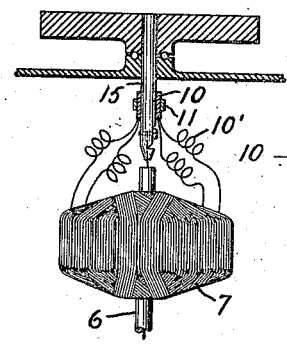
Figure 9:
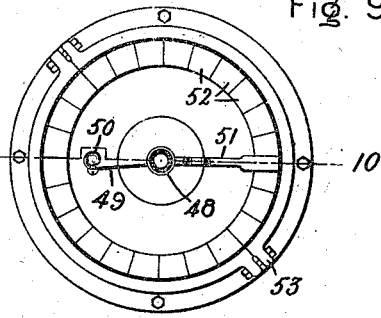
Figure 10:
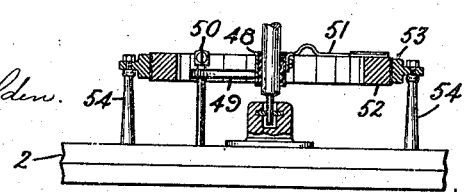
Figure 12:
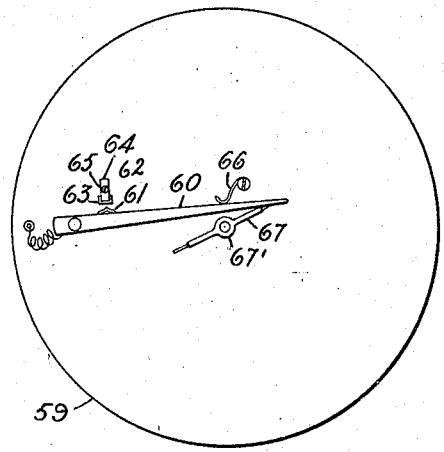
Figure 15:
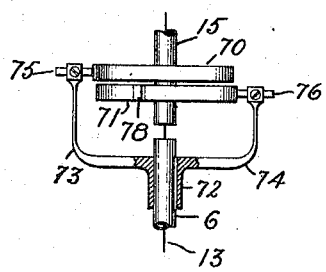
Figure 16:
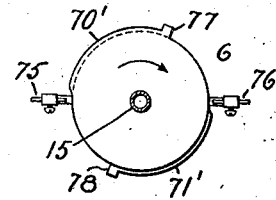

Of the drawings, Figure 1 is a perspective elevation of an electric measuring instrument embodying our invention with the casing removed; Fig. 2 is a sectional elevation of the instrument shown in Fig. 1; Fig. 3 is a sectional plan, taken on line 3 3 of Fig. 4, and Fig. 4 is a sectional elevation illustrating a detail of construction; Fig. 5 is a diagram showing the arrangement of circuits for the instrument shown in Figs. 1 and 2; Fig. 6 is a diagrammatic view showing a modified form of our invention; Fig. 7 is a plan view, and Fig. 8 is a sectional elevation, taken on the line 8 8 of Fig. 7, illustrating one feature of the modification shown in Fig. 6; Fig. 9 is a plan view, and Fig. 10 is a sectional elevation, taken on a line 10 10 of Fig. 9, illustrating another feature of the modification shown in Fig. 6; Fig. 11 is a diagrammatic elevation partly in section showing another modification of our invention; Fig. 12 is a plan view and Fig. 13 an elevation showing a modified form of a portion of the construction employed in Fig. 1; Fig. 14 is a large perspective view showing a detail employed in the construction shown in Fig. 1; and Fig. 15 is an elevation, and Fig. 16 is a plan view, showing still another modification which may be employed in the construction shown in Fig. 1.

Referring particularly to the construction shown in Figs. 1 to 5, inclusive, an electric meter of the well known Thomson recording watt meter type is shown as the measuring element of the instrument. The meter which is supported in frame work 1 carried on the base 2 comprises main field coils 3, an auxiliary starting coil 4 adjustably clamped to the field coils 3 by a thumb screw 5, a vertical shaft 6 which carries an armature 7 turning in the magnetic field produced by the coils 3 and 4, and a brake disk 8 turning between the poles of one or more fixed brake magnets 9. A commutator 10 for the armature 7 is located above it on the shaft 6 which is reduced in diameter to receive it. Brushes 11 coöperating with the commutator are secured to the frame work in the ordinary manner. The shaft 6 is preferably formed in two sections connected together by a coupler member 12, as shown in Fig. 4. The coupler member 12 is provided with a pair of threaded ends separated by a cylindrical collar. The threaded ends screw into threaded openings formed for the purpose in the adjacent ends of the two sections of shaft 6. The upper section of the shaft 6 and preferably the lower section of the shaft also are made tubular. A filament or wire 13 has its lower end detachably secured to a block 14 which fits in a socket formed for the purpose in the lower end of the coupler member 12. The upper end of the filament or wire 13 is secured to the lower end of a shaft 15 in line with its axis by means of a clamping screw 16. The lower end of the shaft 6 is smaller in diameter than the body of the shaft. This result may be obtained by reducing the end of the shaft or, preferably, as shown, by axially inserting a hardened steel pin 17 in the lower end of the lower section of shaft 6. The pin 17 or the reduced portion of the shaft passes through an annular bearing, which may be formed out of diamond, sapphire, or the like, and is carried by a support 18 detachably secured to the base 2. The upper end of the upper section of the shaft 6 may have its bore reduced to a diameter substantially equal to the diameter of the wire in order that the upper end of the shaft may be positioned by its engagement with the wire 13, but preferably the coupling member 12 is located somewhat above the center of gravity of the shaft 6 and parts carried by it so that in the ordinary operation of the instrument the upper end of the shaft will not engage the filament or wire 13. The shaft 15 from which the shaft 6 is supported is the armature shaft of an electric motor 19 which constitutes the working element of the instrument. The motor 19 is carried by a cross bar 20 secured to the side members of the frame 1. The field of the motor 19 comprises a pair of pole pieces 21 energized by suitable magnetizing coils 22. The armature 23 of the motor 19, which is shown as of the Gramme ring type, is mounted in a casing 24 formed of some good conducting material, such as copper. The purpose of this conducting casing will be hereinafter explained. The shaft 15 carries a suitable commutator 25. Brushes 26 engage the commutator 25 to supply current to the armature 23 of the motor 19. The shaft 15 may be supported in any suitable step bearing. In the construction shown in Fig. 2 the shaft carries a disk 27 which rests against balls 28 mounted in a race way formed for the purpose in a block 29 mounted in the yoke connecting the pole pieces 21. The upper end of the shaft 15 carries a worm 15′ which drives a counting train 15″. A pair of diametrically opposed arms 31, see Fig. 14, are carried by a collar 32 adjustably secured to the lower end of the shaft 15. The arms 31 carry at their outer ends a pair of downwardly extending flexible contact members 33. A similar pair of flexible contact members 34 extend upwardly from arms 35 which project in opposite directions from a collar 36 mounted on and insulated from the upper end of the shaft 6. A flexible brush 32′ bears against the collar 32 above the arms 31 and a similar brush 36′ bears against the collar 36 below the arms 35. The flexible contact members 33 and 34 are made of conducting material; preferably however one side of each of the contacts carries a layer of insulating material, as shown in Fig. 14, so that a sufficient movement in one direction of one set of contacts with respect to the other will cause the conducting sides of the flexible contact members to engage, while upon a relative movement in the opposite direction of sufficient extent the non-conducting sides will engage.

The various circuits of the construction shown in Figs. 1 to 4 are shown in Fig. 5 in which lines 37 and 38 convey the electric energy which is to be measured. The coils 3 are shown as connected in series in the line 38. A conductor 39 connects the line 38 to one brush of the meter armature 7. The other brush of the meter armature is connected to the line 37 through the starting coil 4 and a suitable resistance 40. A conductor 41 leads from the line 37 in series through the coils 22 to one of the brushes of the motor 19. The other brush of the motor 19 is connected by a conductor 42 to the brush 32′ which bears against the collar 32. A conductor 43, which includes a regulating resistance 44, is connected to the brush 36′ bearing against the collar 36.

Figure 13:
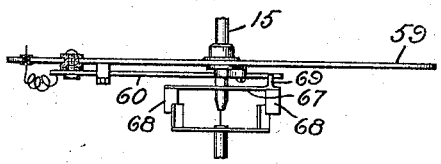
Figure 14:
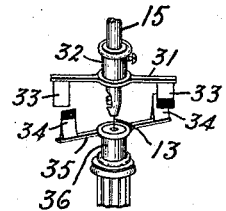

Assuming the initial position of the meter to be that in which the contacts 33 and 34 are separated as indicated in Figs. 5 and 13, upon the passage of current through the coils 3 and 4 and through the coils of the armature 7, the armature 7 will begin to rotate. The only frictional forces retarding the movement of the armature are those produced by the engagement of the brushes 11 with the commutator 10 and the brush 36′ with the collar 36, together with the very insignificant friction between the pin 17 and the annular bearing member 18. These forces are very small. When the armature 7 turns far enough, the contact members 33 and 34 will engage. This will cause current to flow through the windings of the series motor 19, the armature of which will immediately start to revolve. The motor 19 is so wound that the speed given to the shaft 15 is considerably greater than the speed of the shaft 6 under the normal load on the meter. As a result, as soon as the motor 19 is energized by the engagement between the contacts 33 and 34, its armature will move so as to separate these contacts, thus breaking the circuit through the motor 19. The conducting casing 24 coöperates with the pole pieces 21 to form a brake for limiting the speed of armature 23 and for immediately slowing it down when the motor is deënergized. After the separation of the contacts 33 and 34, if the load on the meter continues, the contacts 34 will again approach the contacts 33 and after a slight interval will again engage contacts 33 to energize the motor 19. This operation, including the intermittent energization of the motor 19, is continued as long as the load remains upon the meter. It will, of course, be understood that the motion of the armature shaft is intermittent only with respect to the motion of the shaft 15, and that the shaft 6 will rotate uniformly with respect to the frame work so long as the load on the meter does not change. If the wire or filament 13 is made of torsionless fiber the twisting of the filament will produce no effect on the constant of the meter. If however it is made out of some material such as piano wire, its resiliency may be relied upon to give the necessary starting torque to the armature 7, thus doing away with the necessity for an auxiliary coil 4. It has been found that to establish a working circuit through the motor 19 the contacts 33 and 34 must be pressed together with a certain amount of force. The torsion of the wire or filament 13 may be adjusted to supply this force as well as to supply the starting torque.

In the construction shown in Figs. 6 to 10, inclusive, a modified form of the working element is employed. In this form a ring of laminated magnetic material 45 slotted internally to receive a number of coils 46, which may be form wound, is carried by a bent bar or member 45′ supported from the frame 1. The armature coöperating with the field member 45 consists of a bar 47 of magnetic material mounted upon the shaft 15′. A suitable step bearing for supporting the shaft 15′ is carried by the member 45′. The shaft 6 of the measuring element, which may be similar to the measuring element hereinbefore described, carries near its lower end a collar 48 of conducting material. A brush 49 carried at the upper end of a post 50 which extends upwardly from the base 2 bears against the collar 48. A resilient brush 51 secured to the collar 48 bears against the upper end of a number of commutator segments 52 which are held in an annular clamp 53. The clamp 53 is supported by posts 54 extending upwardly from the base 2. The shaft 15′ upon which the armature 47 is mounted is connected to the shaft 6 through a filament or wire 13 as the shafts 15 and 6 are connected in the construction heretofore described.

Referring to the modified form of our invention shown in diagram in Fig. 6, it is seen that the measuring element is connected to the lines 37 and 38 just as in the diagram shown in Fig. 5. One terminal of each of the coils 46 is connected to the line 37 through the line 55. The other terminals of successive coils 46 are connected to successive commutator segments 52. In Fig. 6 we have shown these terminals grouped together to form a pair of cables 56. A conductor 57 which may include a suitable regulating resistance 58 connects the brush 49 to the line 38. The coils 46, which in the form of our invention shown in Fig. 7 are arranged in three sets overlapping one another, are adapted when successively energized to produce a shifting or rotating magnetic field which will attract the adjacent end of the armature 47 and cause it to turn with the velocity of the rotating field. Upon the passage of current between lines 37 and 38 the armature 7 will begin to rotate and, as the brush 51 passes from one commutator segment 52 to the successive one, successive coils 46 will be energized by the passage of current through line 55, coil 46, commutator segment 52, brush 51, brush 49 and line 57. With this construction therefore, as with the one previously described, the working element and the measuring element turn with the same average speed and make the same total number of revolutions.

In Fig. 11 we have shown a modified construction in which the commutator 10 for the armature 7 is carried at the lower end of the shaft 15, flexible leads 10′ being employed to connect the commutator segments to the armature coils. This modified construction is particularly adapted for use in connection with the construction shown in Figs. 6 and 10 where, by increasing the number of commutator segments 52, the maximum angular displacement between the shaft 6 and 15 may be reduced to a minimum, though this construction may also be employed in other forms of our invention. Whereas in the construction shown in Fig. 1 the commutator being carried by the shaft 15 the frictional retardation produced by the engagement with it of the coöperating brushes 11 will have no effect upon the movements of the measuring element.

In the modified construction shown in Figs. 12 and 13, 59 represents a disk carried at the lower end of the shaft 15. A lever arm 60 is pivoted to but insulated from the under side of the disk 59. To one edge of the arm 60 is connected a suitable contact device 61 which may be tipped with platinum, or other suitable material. Adjacent to the contact device 61 is a contact device 62 secured to and in electrical connection with the disk 59. The contact device 62 may comprise a block 63 of carbon or the like clamped against the under side of the disk 59 by the arm or bar 64 and the screw 65. Any suitable spring device 66 may be employed to normally hold the contact 61 out of engagement with the contact block 63. An arm 67 which is loosely pivoted upon the lower end of the shaft 15, being supported by collar 67′ secured to the shaft, has projecting from its lower side two flexible arms 68, and from its upper side a lug or projection 69. The contact members 68 are adapted to be engaged by the arms of member 34 carried by the shaft 6. When this takes place the arm 67 will be rotated and the lug 69 will engage the arm 60 and force the contact 61 against the contact block 63 against the action of spring 66. The contacts 61 and 62 form switch contacts for controlling the circuit of any suitable working motor, just as the contacts 33 and 34 control the circuit of the motor 19 in the construction shown in Fig. 1. The object in employing the arm 67 instead of allowing one of the contact arms 34 to engage the lever 60 is to obtain a balanced thrust upon the shaft 6 when this engagement takes place. With this construction the lever 60 forms a power multiplying device by which the contacts 61 and 62 can be pressed together with a considerable force even though the torque of the measuring element is quite small.

In Figs. 15 and 16 we have shown still another arrangement for controlling the circuit of the working motor. In this construction the shaft 15 carries a pair of disks 70 and 71. Each of these disks is constructed out of conducting material and is normally insulated from the other. These disks are connected in the circuit controlling the working motor in such a manner that when connected by a suitable short circuiting device the circuit through the working motor is closed. As clearly appears in Fig. 16, a portion 70' of the disk 70 and a diametrically opposed portion 71' of the disk 71, the peripheries of which are concentric with the shaft 15, extend from the shaft farther than do the bodies of the disks. The shaft 6 carries a collar 72 provided with arms 73 and 74 extending from it in opposite directions. The outer ends of these arms are upturned and carry brushes 75 and 76 held in the same planes with the disks 70 and 71 respectively. When the brushes 75 and 76 are opposite the portions 70' and 71', respectively, they engage the outer peripheries of these portions. In this case the brushes 75 and 76 and the arms 73 and 74 and the collar 72, all of which are made of a conducting material, form a short circuiting device connecting the disks 70 and 71, thus closing the circuit through the motor. When the relative positions of the shaft 6 and 15 are such that the brushes are not adjacent the portions 70' and 71', they do not touch the disks and the circuit through the motor is broken.

Assuming the direction of rotation of the shafts 6 and 15 to be that indicated by the arrow in Fig. 16, a movement of the shaft 6 when the shaft 15 is stationary will cause the brushes to engage the portions 70' and 71' and travel along them a short distance before the working motor energized gets up motion enough to move the portions 70' and 71' out of engagement with the brushes 75 and 76 respectively. Any slight retardation to the movement of the measuring element which may occur when the brushes in engagement with the disks move faster than the disks will be compensated for by the slight acceleration to the movement of the measuring element produced immediately thereafter, when the disks move faster than the brushes. Stops 77 and 78 are provided for limiting the maximum relative movement of one shaft with respect to the other.

While we have described somewhat in detail various forms in which our invention may be embodied it will be readily understood by those skilled in the art that many changes can be made from these forms without departing from the spirit of our invention, which in many of its aspects we believe to be much broader than any of the embodiments disclosed.

What we claim as new and desire to secure by Letters Patent of the United States, is,

1. In a measuring instrument, a measuring element rotating in one direction only, a fiber or wire suspension therefor, and means for automatically taking the twist out of said fiber.

2. In a measuring instrument, an element free to revolve under the influence of the force measured, a member from which it is supported by a flexible connection, and means for causing said member to revolve with the same average speed with which said element revolves.

3. In a measuring instrument, a revolving measuring element, a counting train, a motor for driving said counting train, the axes of revolution of said motor and of said measuring instrument being in alinement with each other; a pair of contact devices carried by the motor and diametrically opposed to each other with respect to the axis thereof, and a pair of coöperating contact devices carried by the measuring element.

4. In a measuring instrument, a measuring element revolving in one direction only, a counting train, a motor for driving it, and a flexible connection by which the element is supported from the motor.

5. In a measuring instrument, a rotatable support, a rotatable measuring element supported from said support by a flexible connection, and means for turning said support with the average speed with which the measuring element turns.

6. In a measuring instrument, a rotatable support, a rotatable measuring element supported therefrom by a connection allowing relative movement between the support and the element, and means for causing the support to rotate with the average speed with which the measuring element rotates.

7. In a measuring instrument, a rotatable support, a measuring element supported therefrom by a connection allowing relative movement between the support and the element, and means responsive to a predetermined relative movement in one direction for causing a relative movement in the opposite direction.

8. In combination, an electric motor provided with a vertical shaft, an electric meter comprising an armature, means for supporting said armature from said shaft to allow a relative movement of the armature with respect to the shaft, and means controlled by the meter for energizing the motor upon a predetermined relative movement.

9. In a measuring instrument, a working element rotating in one direction only, a measuring element rotating in the same direction, and a flexible connection by which the measuring element is supported from the working element.

10. In a measuring instrument, a working element, and a measuring element supported therefrom by a flexible connection.

11. In a measuring instrument, a working element movable in one direction only, a movable measuring element, means for supporting said measuring element from the working element arranged to allow a relative movement of one element with respect to the other, and means for limiting said relative movement.

12. In combination, a pair of vertical shafts, one of said shafts being supported from the other by a flexible connection, and independent means for turning said shafts with the same average speed.

13. In combination, a pair of vertical shafts, one of said element, a movable member or device by which it is supported, and means energized from a source independent of the torque of the measuring element for moving the member at the speed with which the said element moves.

14. In a measuring instrument, a measuring element, a counting train, a motor for driving it, a pair of switch contacts for controlling the motor circuit, and operating means therefor comprising a contact device carried by the motor, a coöperating contact device carried by the measuring element, and a power multiplying connection between the switch contacts and the contact device carried by the motor.

15. In combination, a driving element, a measuring element carried thereby, and means operated by the measuring element for controlling the energization of the driving element.

16. In combination, a rotating measuring element, a recording device, and a rotating motor for driving said recording device, the speed of said motor being proportional to and controlled by the speed of the measuring element.

17. In combination, a driving element, a measuring element carried thereby, and a commutator for the measuring element carried by the driving element.

18. In combination, a working element, a measuring element carried thereby through a fiber or wire connection, means for rotating said measuring element, and means controlled by the measuring element for preventing a relative movement of the two elements in excess of a predetermined amount.

19. In combination, a shaft, a motor for driving said shaft, a motor meter including an armature, a non-rigid connection for supporting said armature from said shaft, and means operated by the rotation of said armature for controlling the speed of said motor to cause said shaft and said armature to rotate with the same average speed.

20. In combination, a rotatable member, a motor meter including an armature, a connection for supporting said armature from said member, said connection being arranged to allow relative movement between said member and said armature, and means receiving energy from a source independent of the movement of said armature but controlled thereby for rotating said member with the same average speed with which the armature rotates.

21. In a measuring instrument, a motor, a measuring element having its shaft vertically disposed, a flexible connection between the motor and said shaft for supporting the weight of the latter and the parts carried by it, and a ring bearing for preventing lateral displacement of said shaft.

22. In a measuring instrument, a motor, a measuring element having its shaft vertically disposed, a flexible connection between the motor and said shaft for supporting the weight of the latter and the parts carried by it, and means for preventing lateral displacement of said shaft comprising a ring bearing encircling the lower end of said shaft.

In witness whereof we have hereunto set our hands this 14th day of March, 1904.

ALBERT G. DAVIS.
CARYL D. HASKINS.

Witnesses:
BENJAMIN B. HULL,
HELEN ORFORD.